United States Patent
Uenishi (10) Patent No.: US 11,059,110 B2
(45) Date of Patent: Jul. 13, 2021

(54) MIRROR FINISHING METHOD AND MIRROR FINISHING TOOL

(71) Applicant: FANUC CORPORATION, Yamanashi (JP)

(72) Inventor: Daisuke Uenishi, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/545,186

(22) Filed: Aug. 20, 2019

(65) Prior Publication Data
US 2020/0070255 A1 Mar. 5, 2020

(30) Foreign Application Priority Data

Aug. 29, 2018 (JP) .............................. JP2018-160064

(51) Int. Cl.
*B23C 3/12* (2006.01)
*B23C 5/10* (2006.01)

(52) U.S. Cl.
CPC .................. *B23C 3/12* (2013.01); *B23C 5/10* (2013.01); *B23C 2210/203* (2013.01); *B23C 2220/28* (2013.01); *B23C 2226/315* (2013.01)

(58) Field of Classification Search
CPC .... B23C 2220/60; B23C 3/12; B23C 2222/28
See application file for complete search history.

(56) References Cited

U.S. PATENT DOCUMENTS

2017/0282261 A1* 10/2017 Sakai ........................ B23C 5/10

FOREIGN PATENT DOCUMENTS

| JP | S5389695 U | 7/1978 | |
|----|----|----|----|
| JP | H08155748 A | 6/1996 | |
| JP | 2008229764 A | 10/2008 | |
| JP | 2018008323 A | 1/2018 | |
| WO | WO-2012070759 A2 * | 5/2012 | ........... B24B 13/043 |

OTHER PUBLICATIONS

English translation of WO 2012070759. (Year: 2012).*

* cited by examiner

*Primary Examiner* — Alan Snyder
(74) *Attorney, Agent, or Firm* — Robert P. Michal, Esq.; Carter, DeLuca & Farrell LLP

(57) ABSTRACT

A mirror finishing method for mirror-finishing a workpiece includes: a step of performing a first machining operation with a first tool which has a cylindrical portion made of polycrystalline diamond or cubic boron nitride at the tip of a shank thereof and further has a cutting edge formed by forming a linear groove on the cylindrical portion; and a step of, after the first machining operation has been performed, performing a second machining operation with a second tool which has a cylindrical portion made of polycrystalline diamond or cubic boron nitride at the tip of a shank thereof with no cutting edge on the cylindrical portion.

3 Claims, 7 Drawing Sheets

| | CARBIDE TOOL | CBN TOOL | SLITTED PCD TOOL |
|---|---|---|---|
| EDGE MATERIAL | CEMENTED CARBIDE | CUBIC BORON NITRIDE | POLYCRYSTALLINE DIAMOND |
| RAKE ANGLE | POSITIVE | NEGATIVE | NEGATIVE |
| MARGIN WIDTH | NARROW | NARROW | WIDE |
| DEPTH OF CUT | LARGE | UP TO SEVERAL TENS OF $\mu m$ | UP TO SEVERAL HUNDREDS OF $\mu m$ |
| SURFACE TREATMENT | POLISHED | POLISHED | LASER MACHINED OR ELECTRICAL DISCHARGE MACHINED |
| TOOL LIFE | SHORT | MEDIUM | LONG |
| MACHINED SURFACE QUALITY | LOW | MEDIUM | HIGH |

FIG. 7

MIRROR FINISHING METHOD AND MIRROR FINISHING TOOL

CROSS-REFERENCE TO RELATED APPLICATION

This application is based upon and claims the benefit of priority from Japanese Patent Application No. 2018-160064 filed on Aug. 29, 2018, the contents of which are incorporated herein by reference.

BACKGROUND OF THE INVENTION

Field of the Invention

The present invention relates to a mirror finishing method and a mirror finishing tool for mirror-finishing a workpiece.

Description of the Related Art

Japanese Laid-Open Patent Publication No. 2018-008323 discloses a configuration in which an object to be cut is machined by an end mill made of cemented carbide or the like.

SUMMARY OF THE INVENTION

In a case of mirror-finishing a workpiece, finishing is performed by a mirror finishing tool formed of polycrystalline diamond or cubic boron nitride. When a workpiece made of stainless steel or the like is roughed by an end mill made of cemented carbide as in the technique of Japanese Laid-Open Patent Publication No. 2018-008323, chipping occurs on the cutting tool of the end mill, and streaks and dents may be formed on the machined surface. Even if a mirror finishing tool is used to finish such a workpiece with streaks and dents formed on the machined surface, there is a problem that a mirror-finished surface cannot be stably obtained.

The present invention has been devised to solve the above problems, and it is therefore an object of the present invention to provide a mirror finishing method and a mirror finishing tool capable of stably obtaining a mirror-finished surface.

According to a first aspect of the present invention, a mirror finishing method for mirror-finishing a workpiece includes: a step of performing a first machining operation with a first tool which has a cylindrical portion made of polycrystalline diamond or cubic boron nitride at the tip of a shank thereof and further has a cutting edge formed by forming a linear groove on the cylindrical portion; and a step of, after the first machining operation has been performed, performing a second machining operation with a second tool which has a cylindrical portion made of polycrystalline diamond or cubic boron nitride at the tip of a shank thereof with no cutting edge on the cylindrical portion.

A second aspect of the present invention resides in a mirror finishing tool for mirror-finishing a workpiece, includes: a cylindrical portion made of polycrystalline diamond or cubic boron nitride at the tip of a shank thereof; and a cutting edge formed by forming a linear groove on the cylindrical portion.

According to the present invention, a mirror-finished surface can be stably obtained.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

First Embodiment

Mirror Finishing Method

Figure 1A:
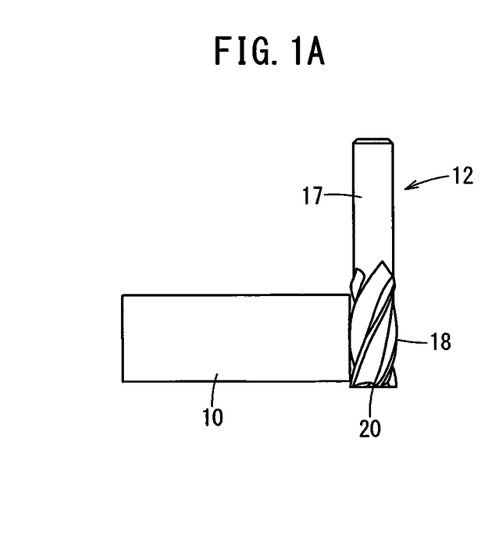
FIG. 1A is a view showing a roughing process.
Figure 1B:
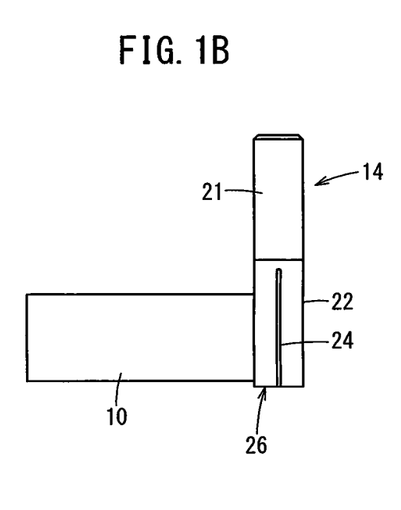
FIG. 1B is a view showing a semi-finishing process.
Figure 1C:
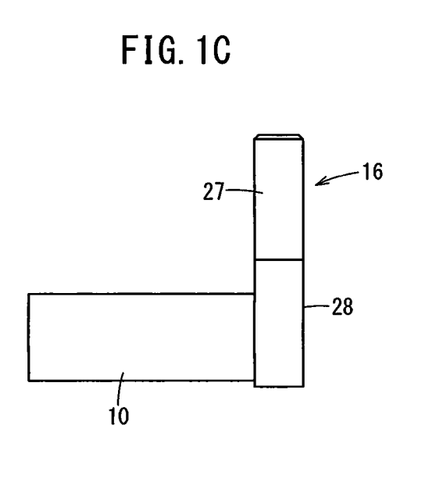
FIG. 1C is a view showing a finishing process.

FIGS. 1A, 1B, and 1C are diagrams for explaining a mirror finishing method. FIG. 1A shows a roughing process, FIG. 1B shows a semi-finishing process, and FIG. 1C shows a finishing process. This embodiment uses a milling machine or a machining center to perform three-staged machining on a workpiece 10 made of a difficult-to-cut material such as stainless steel and thereby obtain a mirror-finished surface of the workpiece 10: (1) roughing with a carbide tool 12, (2) semi-finishing with a slitted PCD tool 14 (i.e., PCD tool having slits), and (3) finishing with a PCD tool 16.

The carbide tool 12 is an end mill having a body (cylindrical portion) 18 formed of cemented carbide at the tip of a shank 17. The carbide tool 12 is a general end mill with the body 18 having four cutting edges 20. The number of cutting edges 20 is not limited to four, and may be two, or four or more.

The slitted PCD tool 14 is an end mill having a body (cylindrical portion) 22 cylindrically formed of polycrystalline diamond (PCD) at the tip of a shank 21. Four linear grooves (slits) 24 extending in parallel in the axial direction are formed on the side surface of the body 22. The grooves 24 are each formed with a cutting edge 26. The number of grooves 24 is not limited to four, and may be two or four or more. The body 22 may be formed of cubic boron nitride (CBN) instead of polycrystalline diamond.

The PCD tool 16 is an end mill having a body (cylindrical portion) 28 cylindrically formed of polycrystalline diamond (PCD) at the tip of a shank 27. Unlike the body 22 of the slitted PCD tool 14, the body 28 of the PCD tool 16 does not have any grooves and thus does not have any cutting edges. The body 28 may be made of cubic boron nitride instead of polycrystalline diamond.

Configuration of Slitted PCD Tool

Figure 2:
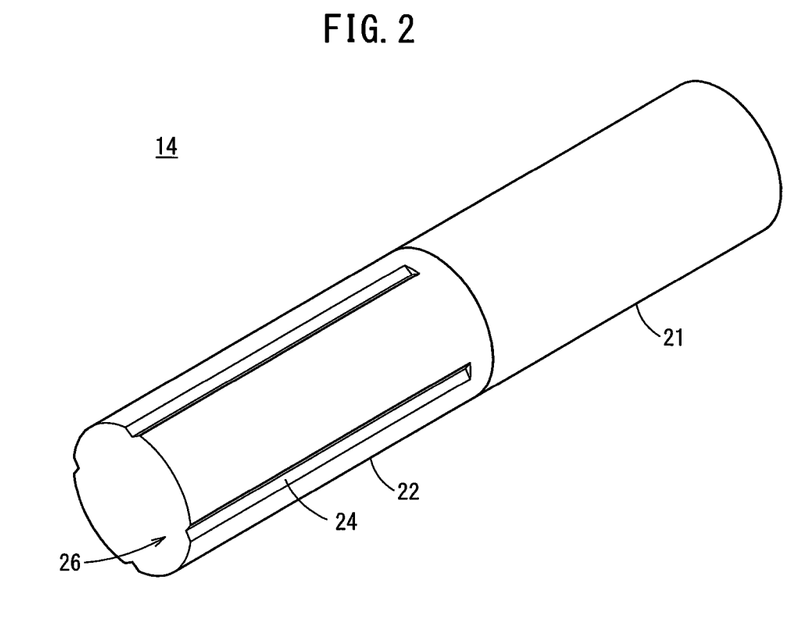
FIG. 2 is a perspective view of a slitted PCD tool.

FIG. 2 is a perspective view of the slitted PCD tool 14. As described above, four grooves 24 extending in parallel in the axial direction are formed on the side surface of the body 22 of the slitted PCD tool 14. The side surface of the cylindrically shaped body 22 made of polycrystalline diamond or cubic boron nitride is subjected to laser machining or electrical discharge machining to thereby form the grooves 24 thereon.

Figure 3:
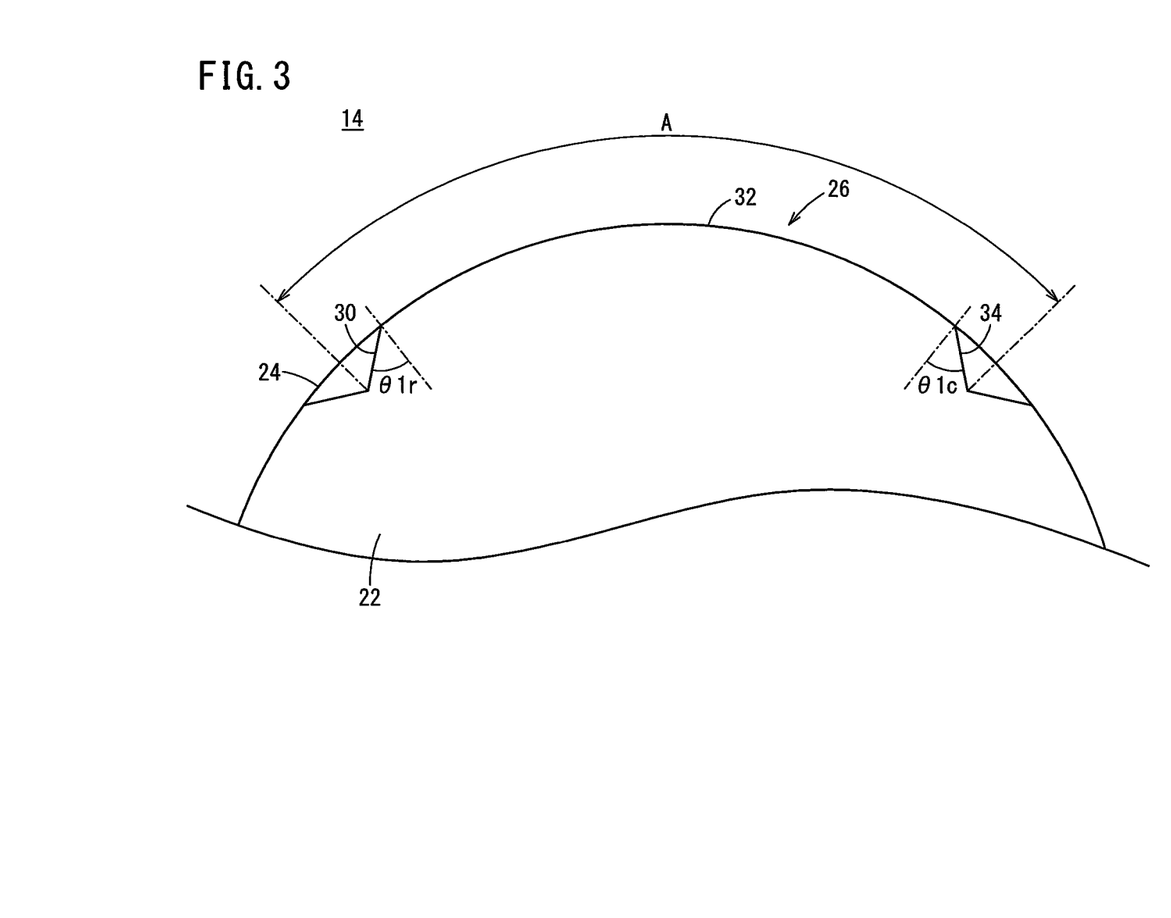
FIG. 3 is a partially enlarged view of a slitted PCD tool as seen from the body side.

FIG. 3 is a partially enlarged view of the slitted PCD tool 14 as viewed from the body 22 side. In the slitted PCD tool 14, an area specified by A in FIG. 3 is regarded as one cutting edge 26. The cutting edge 26 has a rake face 30, a round face 32 and a flank face 34. The rake angle $\theta 1r$ of the rake face 30 of the cutting edge 26 is formed to be negative. The rake angle $\theta 1r$ of the rake face 30 and the clearance angle (or relief angle) $\theta 1c$ of the flank face 34 are substantially equal. Further, the ratio between the width of the groove 24 and the margin width (the width of the round face 32) is specified to be approximately 1 to 9.

Operation and Effect

The semi-finishing processes performed by the carbide tool 12, a CBN tool 36 and the slitted PCD tool 14 will be compared.

Figure 4:
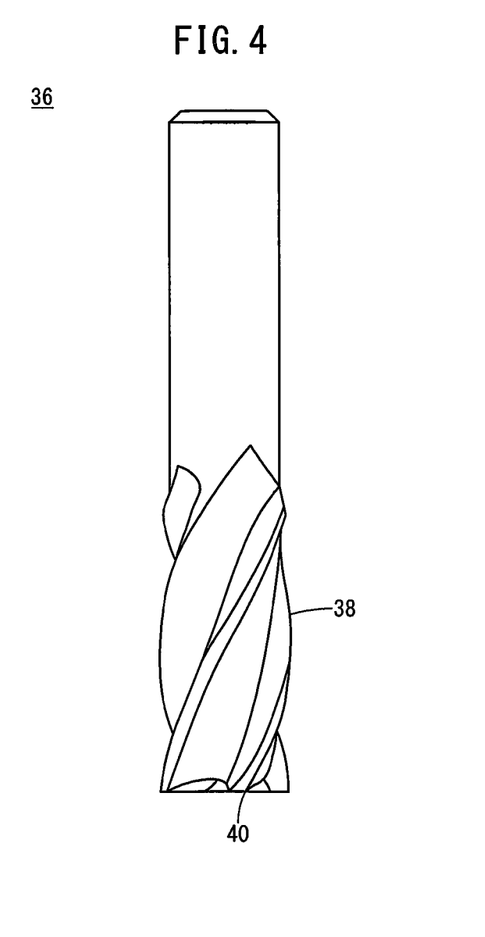
FIG. 4 is a view showing a CBN tool.

FIG. 4 is a view showing the CBN tool 36. The CBN tool 36 is an end mill having substantially the same shape as that of the carbide tool 12. The body 18 of the carbide tool 12 is made of cemented carbide, whereas the body 38 of the CBN tool 36 is made of cubic boron nitride (CBN), which is harder than cemented carbide.

Figure 5A:
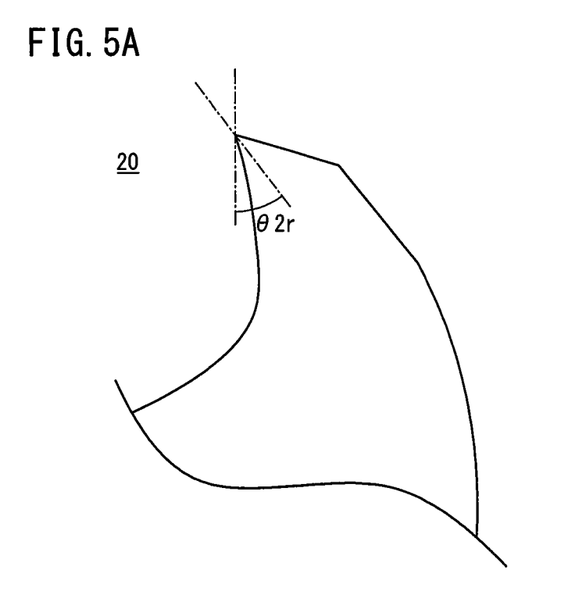
FIG. 5A is an enlarged view of a cutting edge of a carbide tool.
Figure 5B:
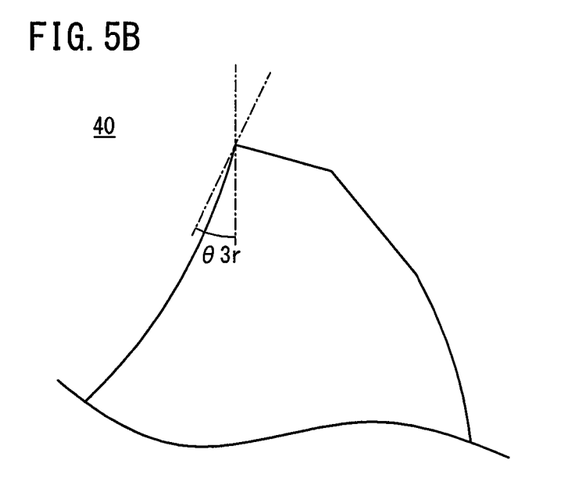
FIG. 5B is an enlarged view of a cutting edge of a CBN tool.

FIG. 5A is an enlarged view of the cutting edge 20 of the carbide tool 12, and FIG. 5B is an enlarged view of a cutting edge 40 of the CBN tool 36. Since the cemented carbide has relatively high toughness, the rake angle $\theta 2r$ of the cutting edge 20 of the carbide tool 12 is formed to be positive. On the other hand, since cubic boron nitride has low toughness, the rake angle $\theta 3r$ of the cutting edge 40 of the CBN tool 36 is formed to be negative.

Figure 6:
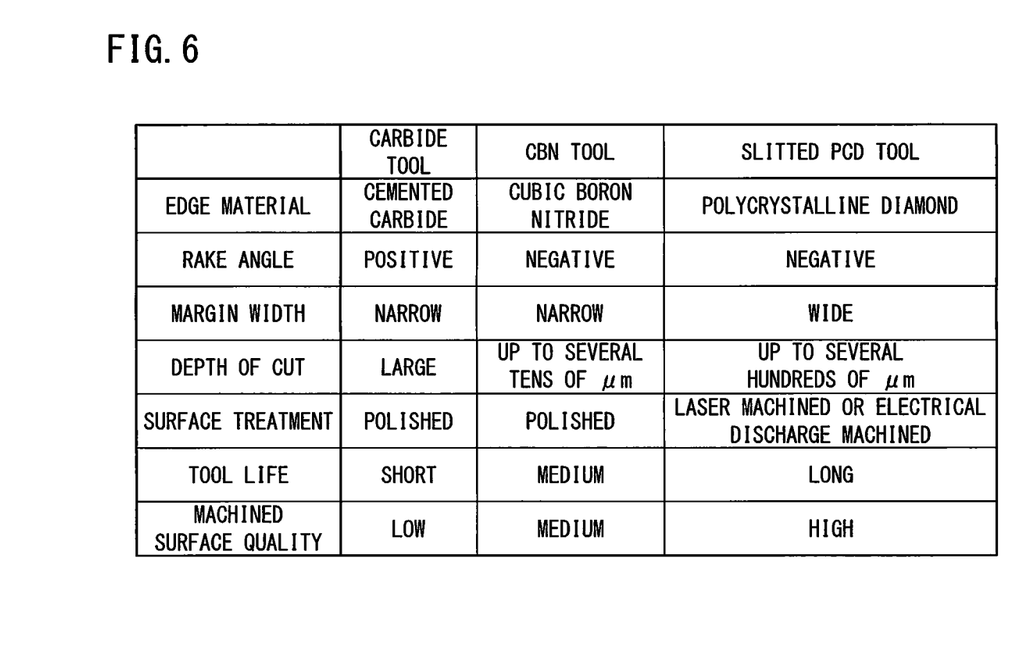
FIG. 6 is a table summarizing the features of a carbide tool, a CBN tool and a slitted PCD tool.

FIG. 6 is a table summarizing the features of the carbide tool 12, the CBN tool 36 and the slitted PCD tool 14.

When the workpiece 10 is made of a difficult-to-cut material such as stainless steel, the tool life of the carbide tool 12 is short, and the continuous machining time is shortened accordingly. Further, the cutting edge 20 of the carbide tool 12 easily chips, and once chipping occurs, the machined surface quality of the workpiece 10 is lowered. If the machined surface quality in the semi-finishing process is low, the workpiece 10 cannot be finished with a fine mirror surface even if finishing is performed using the PCD tool 16, and hence a mirror-finished surface cannot be stably obtained.

When a semi-finishing process is performed using the CBN tool 36, since cubic boron nitride has a higher hardness than cemented carbide, the tool life of the CBN tool 36 is longer than the carbide tool 12 and the continuous processing time can be prolonged. However, even with the CBN tool 36, chipping of the cutting edge 40 cannot be avoided, and once chipping occurs, the machined surface quality of the workpiece 10 is lowered. Further, with the CBN tool 36, the depth of cut can be set at a value ranging only from several μm to several tens of μm, so that management of the depth of cut is difficult.

When a semi-finishing process is performed using the slitted PCD tool 14 as in the present embodiment, since polycrystalline diamond has a hardness higher than cubic boron nitride, the tool life of the slitted PCD tool 14 is longer than that of the CBN tool 36 and the continuous machining time can be further extended. In addition, since the margin width is wide, it is possible to dissipate heat generated on the rake face 30 during the machining toward the round face 32, so that chipping of the cutting edge 26 hardly occurs, and the machined surface quality of the workpiece 10 is thus improved. Therefore, by performing a finishing process with the PCD tool 16 after the semi-finishing with the slitted PCD tool 14, it is possible to stably obtain a mirror-finished surface of the workpiece 10. Further, in the slitted PCD tool 14, it is possible to set the depth of cut at a value up to several hundred μm, so that management of the depth of cut can be made easy.

Surface treatment of the body 18 of the carbide tool 12 and the body 38 of the CBN tool 36 is carried out by polishing, but surface treatment of the body 22 of the slitted PCD tool 14 is carried out by laser machining or electrical discharge machining. Hence, the manufacturing cost of the slitted PCD tool 14 can be reduced.

Modification

Figure 7:
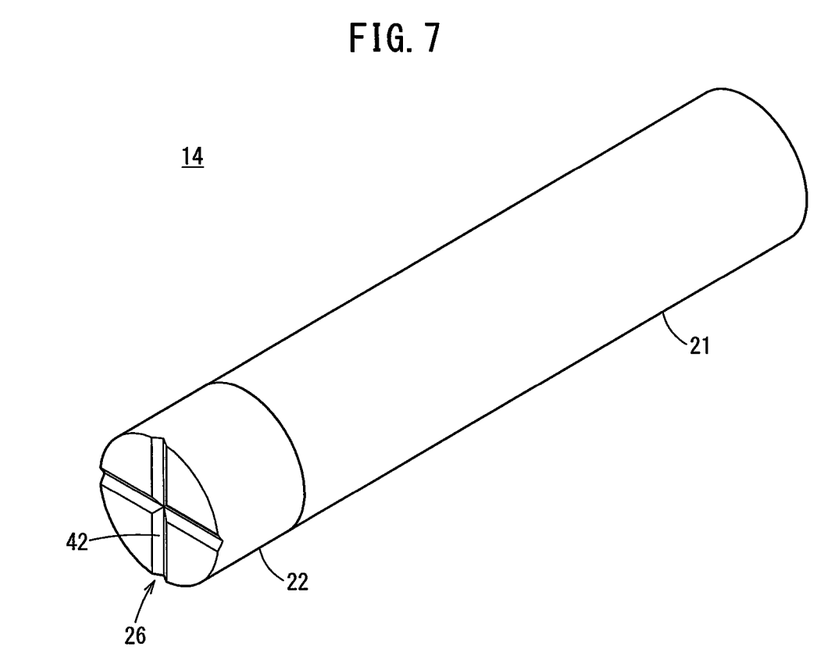
FIG. 7 is a perspective view showing a modification of a slitted PCD tool.

FIG. 7 is a perspective view showing a modification of a slitted PCD tool 14. In the first embodiment, the linear grooves 24 extending in parallel in the axial direction are formed on the side surface of the body 22 of the slitted PCD tool 14. The slitted PCD tool 14 of the first embodiment is used to machine the side surface of the workpiece 10. In order to machine the top and bottom surfaces of the workpiece 10, linear grooves 42 may be formed on the axial endface of the body 22 of the slitted PCD tool 14, as shown in FIG. 7.

Technical Ideas Obtained from Embodiment

Technical ideas that can be grasped from the above embodiment will be described below.

A mirror finishing method for mirror-finishing a workpiece (10) includes: a step of performing a first machining operation with a first tool (14) which has a cylindrical portion (22) made of polycrystalline diamond or cubic boron nitride at the tip of the shank (21) and further has a cutting edge (26) formed by forming a linear groove (24) on the cylindrical portion; and a step of, after the first machining operation has been performed, performing a second machining operation with a second tool (16) which has a cylindrical portion (28) made of polycrystalline diamond or cubic boron nitride at the tip of the shank (27) with no cutting edge on the cylindrical portion. This method makes it possible to achieve stable mirror-finishing performance on the machined surface of the workpiece.

The above mirror finishing method further includes a step of, before the first machining operation, performing a third machining operation with a third tool (12) which has a body (18) made of cemented carbide at the tip of the shank (17), and further has a cutting edge (20) on the body. As a result, even after roughing has been performed by the third tool having a body formed of cemented carbide, a mirror-finished surface can be stably obtained concerning the machined surface of the workpiece.

The mirror finishing tool for mirror-finishing a workpiece (10) includes: a cylindrical portion (22) made of polycrystalline diamond or cubic boron nitride at the tip of the shank (21); and a cutting edge (26) formed by forming a linear groove on the cylindrical portion. With this configuration, the machining efficiency of semi-finishing can be improved.

The mirror finishing tool is configured such that the rake angle ($\theta 1r$) of the cutting edge and the clearance angle ($\theta 1c$) are substantially equal to each other. This configuration makes it possible to easily machine the body of the first tool by laser machining or electrical discharge machining.

The mirror finishing tool is configured such that the ratio between the width of the groove and the margin width of the cutting edge is 1 to 9. This configuration makes it possible to dissipate heat generated on the rake face during machining toward the round face, and hence suppress chipping of the cutting edge.

In the mirror finishing tool, the cutting edge is finished by electrical discharge machining or laser machining. Owing thereto, the manufacturing cost of the first tool can be reduced.

The present invention is not particularly limited to the embodiment described above, and various modifications are possible without departing from the essence and gist of the present invention.

What is claimed is:

1. A mirror finishing method for mirror-finishing a metal workpiece, comprising:
   a step of performing a first machining operation with a first tool, wherein the first tool has a cylindrical portion made of polycrystalline diamond or cubic boron nitride at a tip of a shank thereof and further has a cutting edge formed by forming a linear groove on the cylindrical portion; and
   a step of, after the first machining operation has been performed, performing a second machining operation with a second tool, wherein the second tool has a cylindrical portion made of polycrystalline diamond or cubic boron nitride at a tip of a shank thereof with no cutting edge on the cylindrical portion.

2. The mirror finishing method according to claim 1, further comprising a step of, before the first machining operation, performing a third machining operation with a third tool, wherein the third tool has a body made of cemented carbide at a tip of a shank thereof and further has a cutting edge on the body.

3. The mirror finishing method according to claim 1, wherein the linear groove is a linear recess defined in an outer surface of the cylindrical portion.

* * * * *